No. 636,165. Patented Oct. 31, 1899.
J. M. NAPIER.
THRESHOLD.
(Application filed July 7, 1899.)
(No Model.)
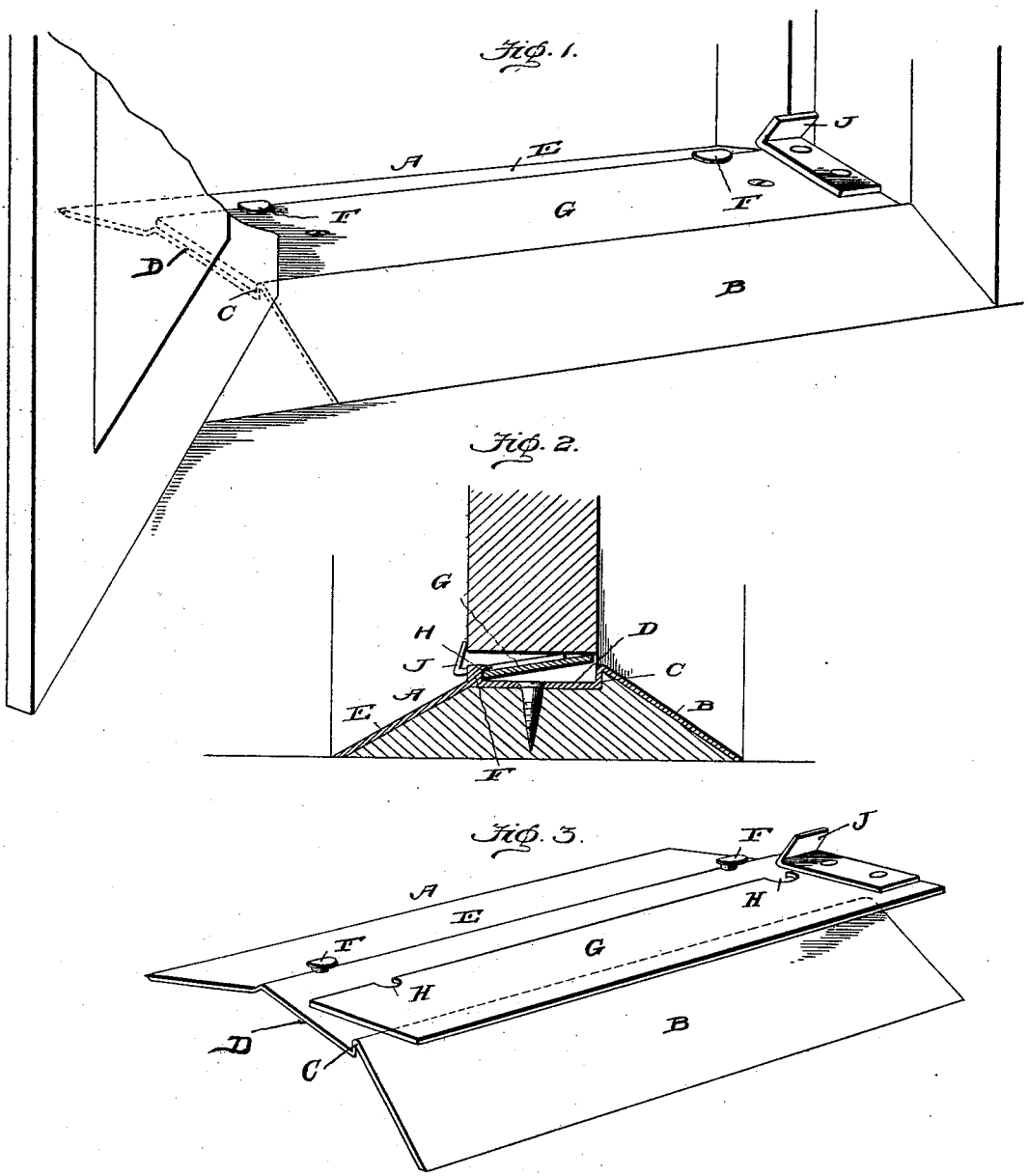

UNITED STATES PATENT OFFICE.

JAMES M. NAPIER, OF TRINIDAD, COLORADO.

THRESHOLD.

SPECIFICATION forming part of Letters Patent No. 636,165, dated October 31, 1899.

Application filed July 7, 1899. Serial No. 723,073. (No model.)

*To all whom it may concern:*

Be it known that I, JAMES M. NAPIER, a citizen of the United States, residing at Trinidad, in the county of Las Animas and State of Colorado, have invented certain new and useful Improvements in Thresholds, of which the following is a specification.

My invention relates to improvements in thresholds; and the main object of my invention is the provision of a threshold which will be entirely dust, wind, rain, and snow proof when the door is closed.

Another object of my invention is the provision of a threshold which is the embodiment of simplicity, durability, and cheapness, thus producing a very useful and practical invention.

To attain the desired object, my invention consists of a threshold embodying novel features of construction and combination of parts, substantially as disclosed herein.

Figure 1 is a perspective view of a door-frame and door with my threshold in position. Fig. 2 is a cross-section of the invention in the position it assumes when the door is closed. Fig. 3 is a perspective view of the device with the spring-metal plate or strip detached.

In the drawings my threshold, which is made of metal, either wrought or malleable, consists of the plate A, bent to form the inner inclined surface or plane B, the short wall C, which terminates into the step or base D, and the outer inclined surface or plane E, the whole forming the base of my threshold. In order that this base may be securely held in place, I employ the headed lugs F, which are formed integral with the base. To rest in the space, or rather upon the step or base D, between the wall C and the lugs F is the spring-metal plate or strip G, which is provided with the notches H to abut and fit around the screws and hold the strip from horizontal movement, but to allow the strip to move as if hinged, as the strip is also provided with the catch or lip J, which may be secured to the strip, as in the drawings, or made integral. Thus it will be seen that when the door is closed the bottom thereof contacts the lip or catch and causes the strip to be tilted as if hinged until the inner edge of the strip contacts the inner edge of the door and prevents the entrance of wind, rain, dust, or snow, and as the plate G is made of flat spring metal the lip J can be contacted more firmly by the door, as the spring in the strip will then allow the plate or strip to be brought more squarely against the bottom of the door.

From the foregoing description, taken in connection with the drawings, it is readily seen that I produce a very simple, durable, and inexpensive threshold and one which is easily and readily applied to any door-frame and is easily and efficiently operated, thus producing a very useful and practical invention.

I claim—

1. A threshold, consisting of a base-plate having a step, headed lugs formed integral with said base, and a spring-metal plate or strip adapted to rest upon said step and be contacted and held there by the lugs, said plate being adapted to be tilted by the door to contact the bottom thereof.

2. A threshold, consisting of a base having oppositely-inclined surfaces, a step or base intermediate of the surfaces, headed lugs formed integral with said base at the upper edge of the shorter surface, and a spring-metal plate or strip adapted to rest upon said step and be held in place by said lugs; said plate being adapted to be tilted by the door to contact the bottom edge thereof.

3. A threshold, consisting of a base having a central step, lugs provided with heads formed integral with the base and having their heads projecting above the step, and a spring-metal plate adapted to fit upon said step and provided with notches to engage the lugs to hold the strip in place and a lip to be contacted by the door to tilt the spring-metal plate.

In testimony whereof I affix my signature in presence of two witnesses.

JAMES M. NAPIER.

Witnesses:
H. B. BROWN,
C. F. TIPTON.